March 28, 1961  F. J. DITTER ET AL  2,977,073
AIRCRAFT SKI AND ACTUATING MECHANISM THEREFOR
Filed June 21, 1956  3 Sheets-Sheet 1

INVENTOR.
FRANCIS J. DITTER
EMMETT J. BOUCHER
BY Stuart R. Peterson
ATTORNEY

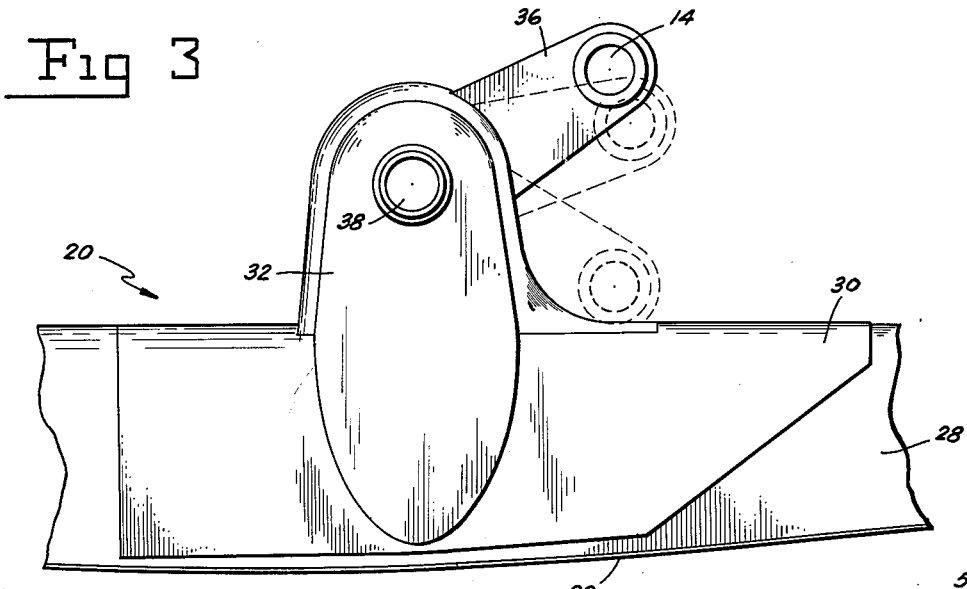
Fig 3
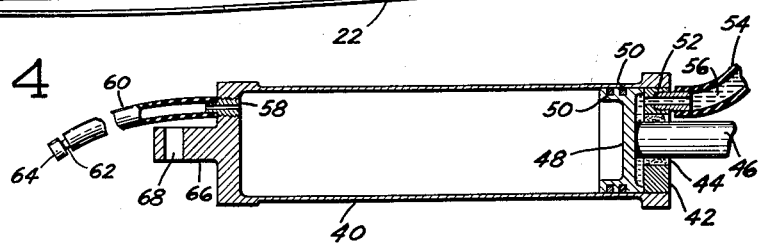
Fig 4
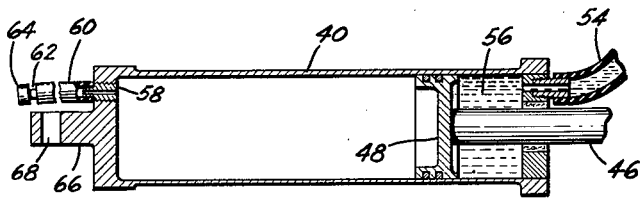
Fig 6
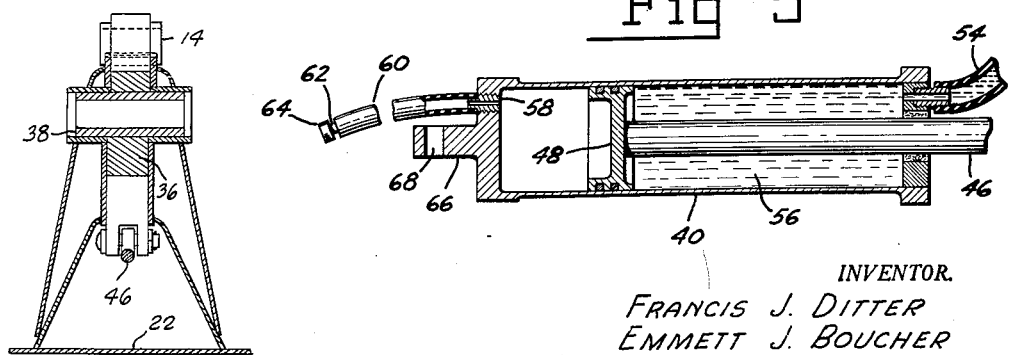
Fig 5
Fig 8
INVENTOR.
FRANCIS J. DITTER
EMMETT J. BOUCHER
BY Stuart R. Peterson
ATTORNEY United States Patent Office 2,977,073
Patented Mar. 28, 1961

2,977,073
AIRCRAFT SKI AND ACTUATING MECHANISM THEREFOR

Francis J. Ditter and Emmett J. Boucher, Minneapolis, Minn., assignors to Federal Industries, Inc., a corporation of Minnesota Filed June 21, 1956, Ser. No. 592,943
1 Claim. (Cl. 244—108)

This invention relates to skis designed for mounting on an airplane landing gear, and pertains more particularly to the actuating mechanism by which each ski can be moved relative to the landing wheel with which it is associated.

In equipping aircraft for all-weather flights it has become customary to mount a ski adjacent to each of the two forward landing wheels, the skis being rendered retractable to permit use of the then lowermost wheels for landing directly on bare ground. It will be appreciated that the compressed air contained within the tires mounted on these wheels is available for shock absorption during such a landing operation. Unfortunately, this pneumatic cushioning is not available when a landing is effected on the skis themselves, and the plane experiences a correspondingly greater amount of jarring and shock on terrain of equivalent roughness or unevenness.

Accordingly, one object of the invention is to provide a pneumatic shock absorbing action that is effective when the aircraft is landing on its skis, thereby permitting a landing commensurate in smoothness with that experienced during a wheel landing.

Another object of the invention is to incorporate the shock absorbing action mentioned above directly into the operating mechanism that is responsible for retracting or extending each ski relative to its juxtaposed wheel without complicating such mechanism, there actually being a simplification in the present instance.

A further object of the invention is to provide a pneumatic cushioning effect that results from the use of compressed air, provision being made so that the air will have to be replenished, if at all, only at infrequent intervals. In this regard, it is planned that the hydraulic fluid used in actuating the ski aid in the prevention of air leakage.

A still further object of the invention is to provide a simplified actuating mechanism for each ski that will not require elaborate control tubing leading from the craft's cabin to the operating mechanism associated with each ski. Regarding this advantage, it is planned that only one tube be employed for each ski, thereby avoiding the use of plural tubing that might otherwise increase the hazards of faulty operation through tube damage. Stated somewhat differently, it is intended that the overall length of hydraulic tubing utilized when practicing the teachings of the instant invention be reduced appreciably over that currently found in many ski installations of this general type, thereby minimizing the likelihood of tube rupture.

Yet another object of the invention is to minimize wind resistance produced by the actuating mechanism itself, it being envisaged that the operating cylinder, together with portions of its associated mechanical linkage, be mounted within the confines of the ski structure.

A further object of the invention is to provide an actuating mechanism of the foregoing character that will be exceedingly lightweight, yet completely reliable in its operation.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Figure 3 is a fragmentary elevational view, the solid line position of which corresponds to the solid line position of Figure 2 and the two dotted line positions of the ski arm representing relative angularities that the arm would assume were the ski to be held stationary during an operational sequence and the wheel axle moved;

Figure 4 is a sectional view of the operating cylinder and its piston taken in the direction of line 4—4 of Figure 2;

Figure 2:
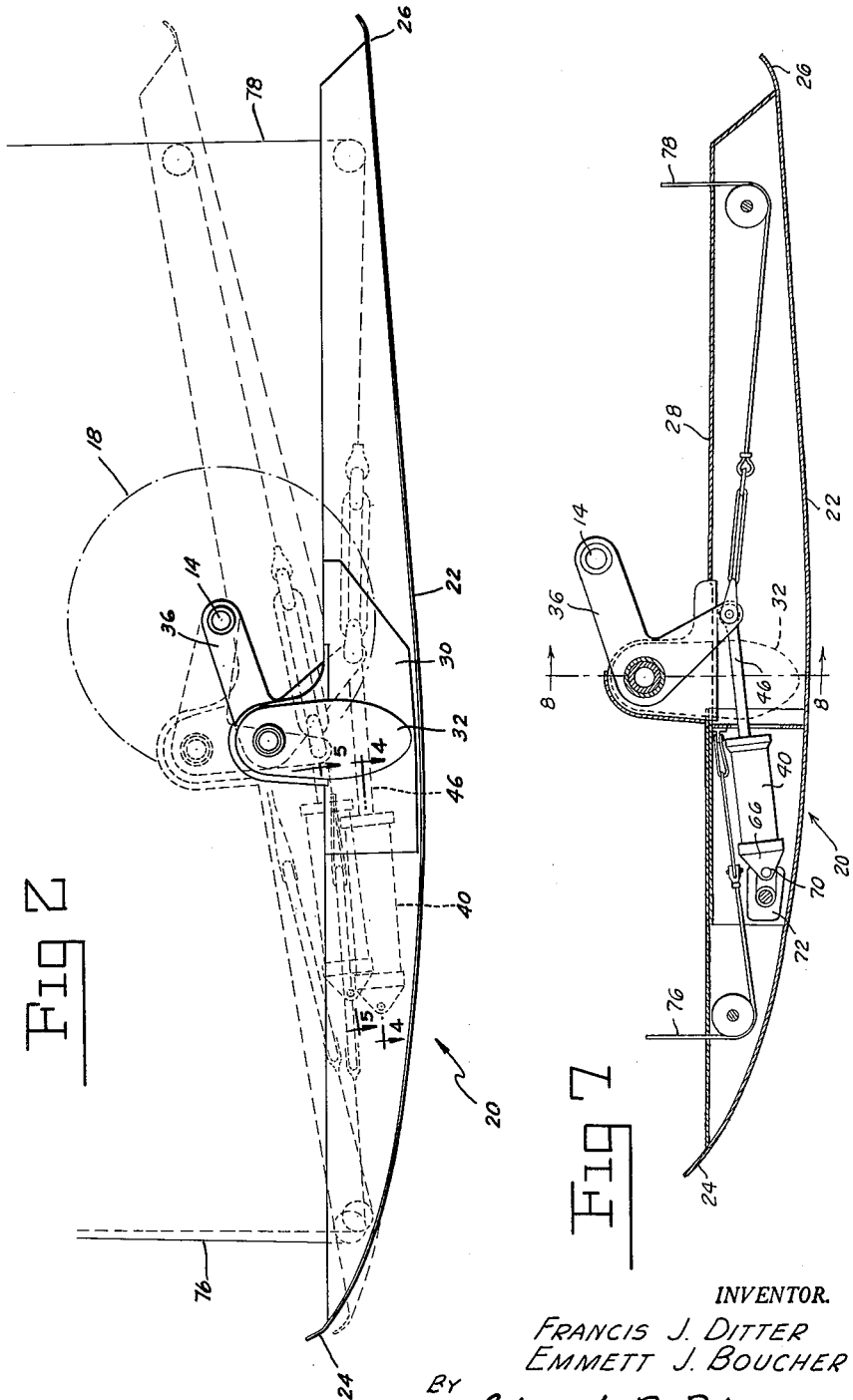
Figure 2 is a side elevational view of one of the skis of Figure 1, the solid line position depicting the ski in a lowered position for landing and the dotted line position illustrating its raised or retracted position relative to its associated wheel.

Figure 5 is a sectional view corresponding to Figure 4, but being taken in the direction of line 5—5 of Figure 2, Figure 6 is a sectional view whose position is intermediate Figures 4 and 5, Figure 7 is a longitudinal sectional view taken substantially through the center of Figure 2, and Figure 8 is a transverse sectional view taken in the direction of line 8—8 in Figure 7.

Figure 1:
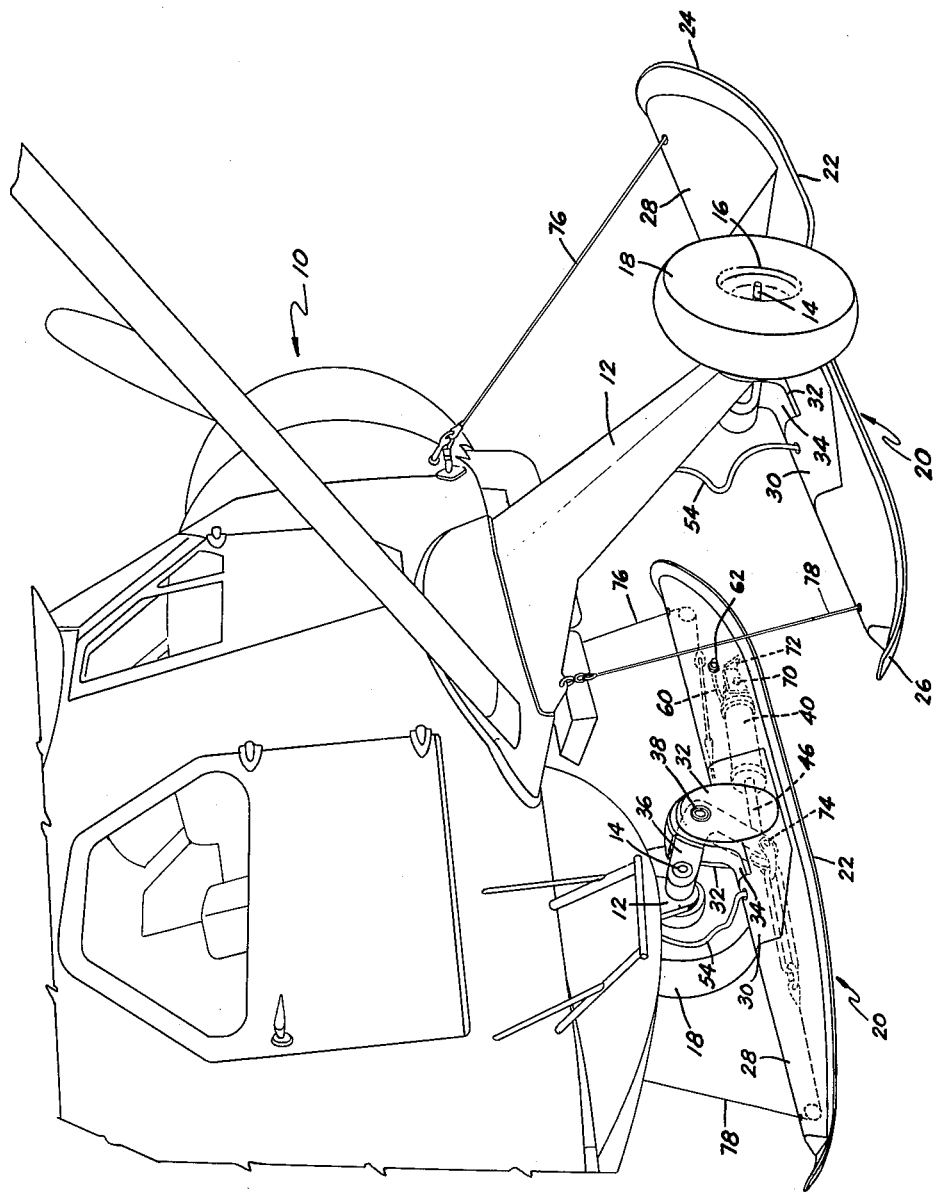
Figure 1 is a perspective view of an airplane equipped with skis actuatable in accordance with the teachings of the present invention, the actuating mechanism appearing in dotted outline within one ski.

Referring now in detail to the drawings, a forward portion of an airplane 10 is presented having typical landing gear 12. While the landing gear 12 may assume a variety of configurations, for the sake of drawing simplicity, the gear here has been pictured as including a pair of properly reinforced struts, one of which is completely visible in Figure 1 and the other of which has only its lower end showing. Each strut carries an axle 14 at its lower extremity, the outboard portion of which journals a wheel 16 having mounted thereon a pneumatic tire 18 in conventional fashion.

The inboard portion of each axle 14, in the exemplified instance, supports a ski designated in its entirety by the reference numeral 20. Each ski is a correlation of the other, including in the illustrative situation a base shoe or runner portion 22 curving upwardly at both its toe 24 and heel 26. The forward half of the shoe 22 is of wider construction than the rear half, thereby leaving space for the wheel 16 in each instance. Superimposed on the base shoe 22 and forming part of the ski structure is an inverted channel member 28 suitably flanged so as to permit attachment to its base shoe by riveting, spot-welding, bolting or the like.

Continuing with the description of the exemplified ski construction, it will now be explained that a portion of each channel member 28 is cut out or removed so that a saddle 30 may be fixedly secured in its stead. These saddles 30, one on each ski, are each equiped with upstanding pedestal elements 32 spaced apart sufficiently so as to provide an intervening space or opening 34.

The opening between the pedestals 32 of each ski provides accommodation for a bell crank arm 36 which is a part of the actuating mechanism for each of the skis. The mid-portion of each bell crank 36 is pivotally supported between pedestals 32 by a transverse pin 38, whereas one end of the crank is journaled for rotation about the inboard portion of the axle 14 (or its equivalent when the axle is not used) and its other end extends downwardly through the opening 34 into the chamber formed within the interior of the ski.

The heart of the actuating mechanism for each ski is an operating cylinder 40, seen to better advantage in the sectional views presented in Figures 4–6. One end of the cylinder 40 is equipped with a head 42 apertured and provided with a suitable packing gland 44 (only generally set forth) through which a piston rod 46 projects. The rod 46 is fixedly attached at its inner end to a reciprocal piston 48 equipped with O-rings 50.

Through the agency of a nipple 52 and a tube 54 hydraulic fluid in the form of a liquid 56 may be introduced under pressure into the end of the cylinder having the head 42. Quite obviously, in actual practice a high pressure type of hydraulic coupling would serve to connect the tube 54 to the cylinder 40, there being a number of such couplings currently available. From Figure 1 it can be seen that the tube 54 leads upwardly to the cabin of the aircraft where it connects to a suitable pumping system by way of appropriate control valves so that the liquid may be forced into the cylinder 40 of each ski when it is desired to retract the skis relative to their respective wheels 16.

At the opposite or closed end of the cylinder 40 is another nipple 58 to which is attached a relatively short length of tubing 60, being of sufficient length to lead to one side of the inverted channel member 28. Here again it might be explained that the nipple connection is only schematically depicted and that suitable high pressure coupling means would normally be employed, simplification of the drawings being achieved by not detailing a specific coupling. The end of the tube 60 lying remote from the cylinder, that is the end located adjacent the channel member 28, is provided with normally closed valve 62 of conventional construction but of course adequate to withstand the relatively high pressures to which it is at times subjected, for instance the 1100 p.s.i. hereinafter mentioned. A valve cap 64 is applied to the end of the valve 62. From Figure 1 it will be discerned that the valve 62 is fixedly secured to the material constituting the channel member 28 and thereby is readily accessible for filling purposes. However, it is to be noted that the tube 60 terminates at the side of the ski 20 and therefore there is no external tubing associated with this feature of the invention, there being only the single tube 54 for each ski.

Pivotal connection is established between the closed end of the cylinder 40 and a fixed portion of the ski structure 20 by means of an integral ear 66 formed on the cylinder having a transverse aperture 68 through which extends a pin 70, the pin engaging a clevis and bracket 72 which may be riveted, welded or otherwise affixed to the ski. The piston rod 46, on the other hand, is pivotally attached to the lower end of the bell crank arm 36 by reason of a pin 74.

As a practical matter it may be pointed out that each ski 20 is equipped with forward and aft shock cord rigging 76 and 78, respectively. Since the rigging 76 and 78 may be of conventional construction, the stabilizing purpose of which is well known, the various parts thereof need not be described with any degree of particularity, it is believed.

From the foregoing description it is thought that the mode of operation will be readily apparent. However, further comment directed specifically to the manner in which the actuating mechanism functions may well prove to be of benefit.

Accordingly, at this time reference should be had to Figure 2, taken together with Figures 4, 5 and 6. First of all, it may be explained that the operating cylinder 40 is charged with compressed air, say 220 pounds per square inch, via the valve unit 62. Without hydraulic pressure sufficient to overcome this air pressure, the piston 48 will be urged to the right as viewed in Figure 4. This is the extended position of the ski 20 relative to its associated wheel 16 (see Figure 2). It will be recognized that the piston rod 46 causes a counter-clockwise rotation of the bell crank arm 36 (Figure 2), for the closed end of the cylinder 40 is fixed except for its ability to pivot about the pin 70, and that this rotational movement lowers the ski.

Assuming now that the piston 48 has been permitted to move into the position depicted in Figure 4 by virtue of the compressed air, the skis 20 are then extended below the tires 18 preparatory to effecting a ski landing. When the skis 20 engage the ice or snow covered ground during the landing operation, the force is such that the bell crank 36 of each ski will be urged in a clockwise direction (Figure 2) with the consequence that the piston 48 will be moved to the left (Figure 6), thereby compressing the air contained within the cylinder 40 that we have assumed above to have an original or initial pressure of 220 p.s.i. The amount of additional compression will of course vary depending upon the pilot's ability to land smoothly and other factors. Therefore, we will presume that the Figure 6 position represents, say, only a static loading, i.e., represents just the weight of the plane itself. Typically, this may cause an air compression to a value of say, 265 p.s.i. any shock resulting from the landing operation producing a compression of greater magnitude.

To give a general idea as to the relative angular positions that the bell crank 36 will assume in shouldering the above-mentioned static load, attention is to be directed to Figure 3. For simplicity of illustration Figure 3 is presented with the ski 20 remaining stationary and with the axle 14 moving instead. Hence, the top dotted line position of the bell crank arm is indicative of the relative position pictured in Figure 6.

Proceeding now to what is done to effect a retraction of the skis 20 for a wheel-type landing, attention should be shifted to Figure 5. Here liquid has been introduced into the cylinder 40 under sufficient pressure from the cabin's pumping system via the tube 54 to cause travel of the piston 48 to the left. This, for example, may cause compression of the air to, say 1100 p.s.i. At any rate piston rod 46 exerts a pull on the bell crank 36 so as to cause a clockwise rotation thereof about the axle 14 (Figure 2), thereby lifting or retracting the ski 20 relative to its associated wheel 16 and tire 18. Reference should at this time be had to the lower dotted line position of the arm 36, as seen in Figure 3, this view presenting the greatest relative angular movement between said bell crank arm and the ski.

When the pressure applied to the piston 48 by the liquid 56 is reduced, say, back to a value less than our first-mentioned 220 p.s.i. the piston 48 will return to its Figure 4 position to extend or lower once again the ski. Especial note should be taken that escape of air past the piston 48 is virtually impossible owing chiefly to the liquid 56 and the pressure to which it is subjected. However, should the air need replenishing as a result of a prolonged shut down or inspection, this can readily be effected by way of the valve unit 62, suitable access being had thereto at the side of each ski. It should also be borne in mind that only a single exterior tube 54 is necessary for each actuating mechanism, thus reducing the chances of tube failure during flight or while landing. Further, the actuating mechanism is so designed that it can be mounted almost entirely within the confines of the ski it is to move.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

What is claimed:

In combination with an aircraft provided with a landing gear having a wheel rotatably carried thereon, an aircraft ski associated with said wheel provided with a bottom runner portion, a bell crank having an upper end pivotally connected to said landing gear, an intermediate portion pivotally connected to a portion of said ski above said runner portion and having its lower end directed toward said runner portion, a cylinder extending generally longitudinally of the ski having a normally closed end pivotally anchored to a portion of the ski nearer the forward end of said ski, a reciprocable piston within the cylinder having a piston rod projecting from the other end of said cylinder, the projecting end of said piston rod being pivotally connected to said lower end of said bell crank, first shock cord rigging connected at one end to said lower end of said bell crank and at its other end to the aircraft, means directing said shock cord rigging longitudinally of the ski toward the rear of the ski and then upwardly to said aircraft, second shock cord rigging connected at one end to the forward end of the ski and at its other end to the aircraft, and means for introducing liquid under pressure into said other end of the cylinder to cause said lower end of the bell crank to traverse an arc so as to raise said ski relative to said wheel, whereby release of liquid pressure will permit return of said ski to its lowered position relative the wheel when sufficient air is confined between said piston and the closed end of said cylinder, said air being compressed when said piston moves toward said closed end.

References Cited in the file of this patent

UNITED STATES PATENTS

| | | |
|---|---|---|
| 2,193,736 | Onions | Mar. 12, 1940 |
| 2,294,918 | Levy | Sept. 8, 1942 |
| 2,532,611 | Ditter | Dec. 5, 1950 |